US009402352B2

(12) United States Patent
Bortolussi et al.

(10) Patent No.: US 9,402,352 B2
(45) Date of Patent: Aug. 2, 2016

(54) APPARATUS FOR THE MECHANIZED DISPLACEMENT OF MOVABLE WIRES ON A ROW OF PLANTS AND RELATIVE PROCESS OF OPERATION

(76) Inventors: Claudio Bortolussi, Fiume Veneto (IT); Franco Bortolussi, Fiume Veneto (IT)

( * ) Notice: Subject to any disclaimer, the term of this patent is extended or adjusted under 35 U.S.C. 154(b) by 268 days.

(21) Appl. No.: 13/984,108

(22) PCT Filed: Feb. 24, 2012

(86) PCT No.: PCT/EP2012/053180
§ 371 (c)(1),
(2), (4) Date: Aug. 7, 2013

(87) PCT Pub. No.: WO2012/119871
PCT Pub. Date: Sep. 13, 2012

(65) Prior Publication Data
US 2013/0312326 A1   Nov. 28, 2013

(30) Foreign Application Priority Data

Mar. 4, 2011   (IT) .............................. PN2011A0014

(51) Int. Cl.
*A01G 17/08*   (2006.01)
*A01G 17/04*   (2006.01)
*A01G 17/06*   (2006.01)

(52) U.S. Cl.
CPC ................ *A01G 17/04* (2013.01); *A01G 17/06* (2013.01); *A01G 17/08* (2013.01)

(58) Field of Classification Search
CPC .......... A01G 9/12; A01G 17/06; A01G 17/08
USPC ................................ 47/1.01 S, 44, 46, 58.1 R
See application file for complete search history.

(56) References Cited

U.S. PATENT DOCUMENTS

| 3,526,055 A | * | 9/1970 | Cortopassi | ............. | A01B 39/12 |
| | | | | | 172/517 |
| 4,989,365 A | * | 2/1991 | Roger | .................. | A01G 17/085 |
| | | | | | 47/1.01 R |
| 8,225,547 B2 | * | 7/2012 | DeBruin | ................ | A01G 9/126 |
| | | | | | 47/1.01 S |

(Continued)

FOREIGN PATENT DOCUMENTS

EP       0 318 406 A2    5/1989
FR       2 569 525 A1    3/1986

(Continued)

OTHER PUBLICATIONS

Jun. 13, 2012 Search Report issued in International Patent Application No. PCT/EP2012/053180.

(Continued)

*Primary Examiner* — David Parsley
(74) *Attorney, Agent, or Firm* — Oliff PLC

(57) ABSTRACT

An apparatus for the mechanized displacement of movable wires arranged on opposite sides of a row of plants, in particular grapevines, includes a frame suitable to be removably mounted on a farm vehicle, the frame being provided with a mover configured to move the movable wires. The apparatus is characterized in that the mover includes a pair of opposite gripping elements, each of which being suitable to slidingly receive one of the movable wires, the gripping elements being movable in a sequential and synchronized manner along at least two orthogonal axes so as to displace the movable wires from a first height to a second height.

4 Claims, 6 Drawing Sheets

(56) References Cited

U.S. PATENT DOCUMENTS

2007/0033914 A1* 2/2007 Scott .................. A01G 17/026 56/16.8
2011/0005634 A1* 1/2011 Schmitt ............... A01G 17/085 140/113

FOREIGN PATENT DOCUMENTS

| FR | 2 897 233 | A1 | 8/2007 |
| IT | PN2010A000023 | | 10/2011 |
| WO | WO 03/096793 | A1 | 11/2003 |
| WO | WO 2005/048691 | A2 | 6/2005 |
| WO | WO 2011/131468 | A1 | 10/2011 |

OTHER PUBLICATIONS

Jun. 13, 2012 Written Opinion issued in International Patent Application No. PCT/EP2012/053180.

* cited by examiner

APPARATUS FOR THE MECHANIZED DISPLACEMENT OF MOVABLE WIRES ON A ROW OF PLANTS AND RELATIVE PROCESS OF OPERATION

The present invention concerns an apparatus for the mechanized displacement of movable wires arranged on opposite sides of a row of plants, in particular grapevines, and the process of operation of said apparatus.

In agriculture, and particularly in the viticultural field, a well-known practice is to arrange support structures for the plants consisting of rows of poles driven into the ground so as to form the vine rows. The poles are spaced apart from each other and are interconnected in their parts above the ground by a horizontal wire, called "carrying wire", fastened on said poles at a suitable height above the ground. On the two poles at the ends of each row, called "head poles", is also fastened at least one pair of parallel wires arranged on respective sides of each pole in the row. These wires are commonly called "containment wires" or "movable wires" because, during the different phases of cultivation of the plants, they are moved to different heights above the ground to contain and train the growing vegetation according to a desired configuration. In the intermediate poles in the row, included between the head poles, are provided suitable supports, or hooks, for temporarily fastening the movable wires at one or more heights above the ground.

In winter, when the vine shoots are very short or are completely absent, the pairs of movable wires are arranged in a position closer to the ground. In the spring and summer seasons, when the plants are in full growth, each pair of movable wires is progressively moved to a position farther from the ground in the direction orthogonal to the ground, to harness the foliage between the wires of each pair, thus making it grow according to a desired configuration.

According to a well-known method, at least one of the ends of the movable wires is fastened to a head pole on the row by means of metal chains provided with a suitable coupling device or suitable clamps, which were used to fasten one of the chain links to the pole. With this fastening solution, when it is necessary to move each movable wire to another position, the wire must first be loosened by uncoupling the relative chain from the pole, then repositioning the movable wire at the desired height, and finally coupling the chain back on the pole. These manual operations, all of them fairly complex and strenuous, require the presence of at least two persons, one to support the chain while keeping the movable wire taut, and at least another person to move the movable wire to a new position. Thus it is evident, especially considering the fact that on a tilled field the rows are numerous and of considerable length, that such a fastening configuration of the movable wires on a head pole of a row of vines involves a considerable amount of physical labour and relatively long working times and considerable costs.

As a partial improvement of the chain-based fastening method, in the International Patent Application WO 2005/048691 is disclosed an elastic compensation device that makes it possible for a single person to vertically reposition each movable wire. According to this embodiment, at least one end of each movable wire is coupled to a first end of an elastic compensation device stably fixed to the head pole in the row. Although the manual work that the operator is required to carry out is considerably reduced in comparison with the plant rows in which the movable wires were fastened with chains to the head poles, this work remains substantial, considering the fact that, for each of the two sides of each row, the operator will have to release the movable wire previously arranged at a first height above the ground and to fasten it again at a second height different from the first one. In this situation, too, when there are many rows of plants of considerable length, the manual operations of displacing the movable wires can be rather strenuous.

Recent solutions proposed for fastening the movable wires on a row of plants include one or more sliding guides arranged near the head poles of each row in a manner substantially vertical with respect to the ground. On the guides are mounted sliding means on which are stably fastened the movable wires. An example of such an arrangement is shown in the Italian Patent Application ITPN2010A000023. With such configuration, the displacement of the movable wires is even more simplified compared to the solution described above, but it still remains characterized by manual operations that imply the possible release of the movable wires previously arranged at a first height above the ground, and their subsequent placement at a second height different from the first one. Thus it can be appreciated how, in this situation too, the manual operations for repositioning the movable wires remain laborious.

In the present state of the art are also known automatic machines capable of repositioning the movable wires of rows of plants, typically grapevines, by means of rotating elements. An example of such machines is described in European Patent EP 0 318 406. This type of machines have however an important shortcoming that consists in the considerable damage that the rotating bodies can cause to the vegetation, with negative effects on the yield in terms of fruit production.

The objective of the present invention is therefore to provide an apparatus capable of mechanically displacing the movable wires on a row of plants, in particular grapevines, and to provide the process of operation of said apparatus.

In the scope of the above objective, one purpose of the present invention is to provide an apparatus for the mechanized displacement of the movable wires on a row of plants that cuts down to a minimum the need of manual operations.

Another purpose of the present invention is to provide an apparatus for the mechanized displacement of the movable wires on a row of plants in both a completely automatic and a semi-automatic mode.

A further purpose of the present invention is to provide an apparatus for the mechanized displacement of the movable wires on a row of plants that is easy to manufacture and simple to install on a normal farm vehicle, such as for example a tractor.

One not least important purpose of this invention is to realize an apparatus for the mechanized displacement of the movable wires on a row of plants that safeguards the condition of the foliage during the operations of repositioning the movable wires.

A further purpose of the present invention is to provide a process of operation of said apparatus that can be practicable in both a completely automatic and a semi-automatic mode.

Another purpose of the invention is to realize a process of operation of said apparatus that is reliable and that can be easily adapted to rows of plants provided with any number of movable wires and to their different configurations for fastening said movable wires on the head poles.

The above objective and purposes are achieved by an apparatus for the mechanized displacement of the movable wires on a row of plants. Characteristics and advantages of the invention will become evident from the description which follows, given by way of non-restrictive example, with reference to the enclosed drawings, wherein.

Figure 1:
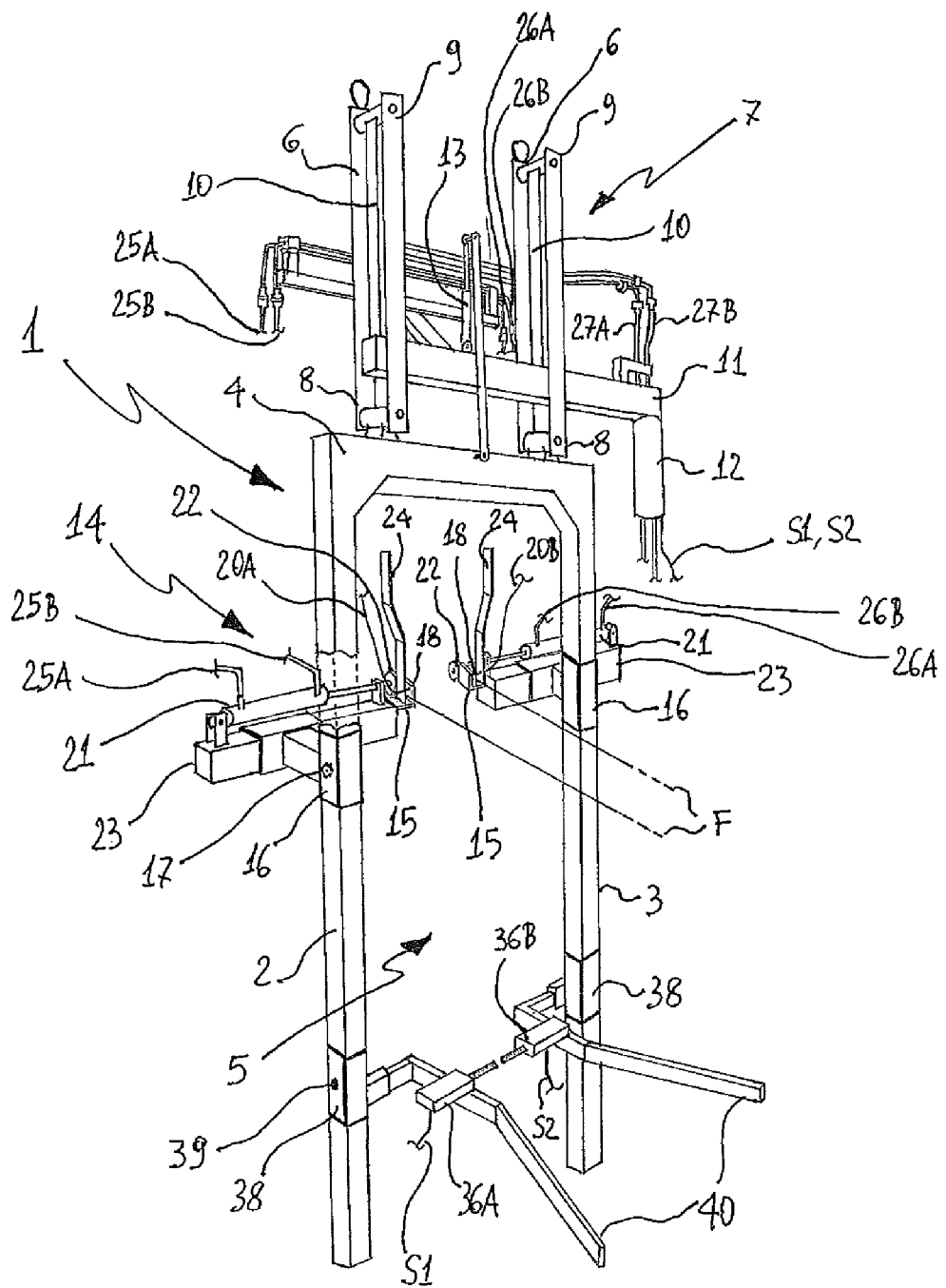
FIG. 1 shows a partially phantom perspective view of a first embodiment of an apparatus according to the present invention.
Figure 2:
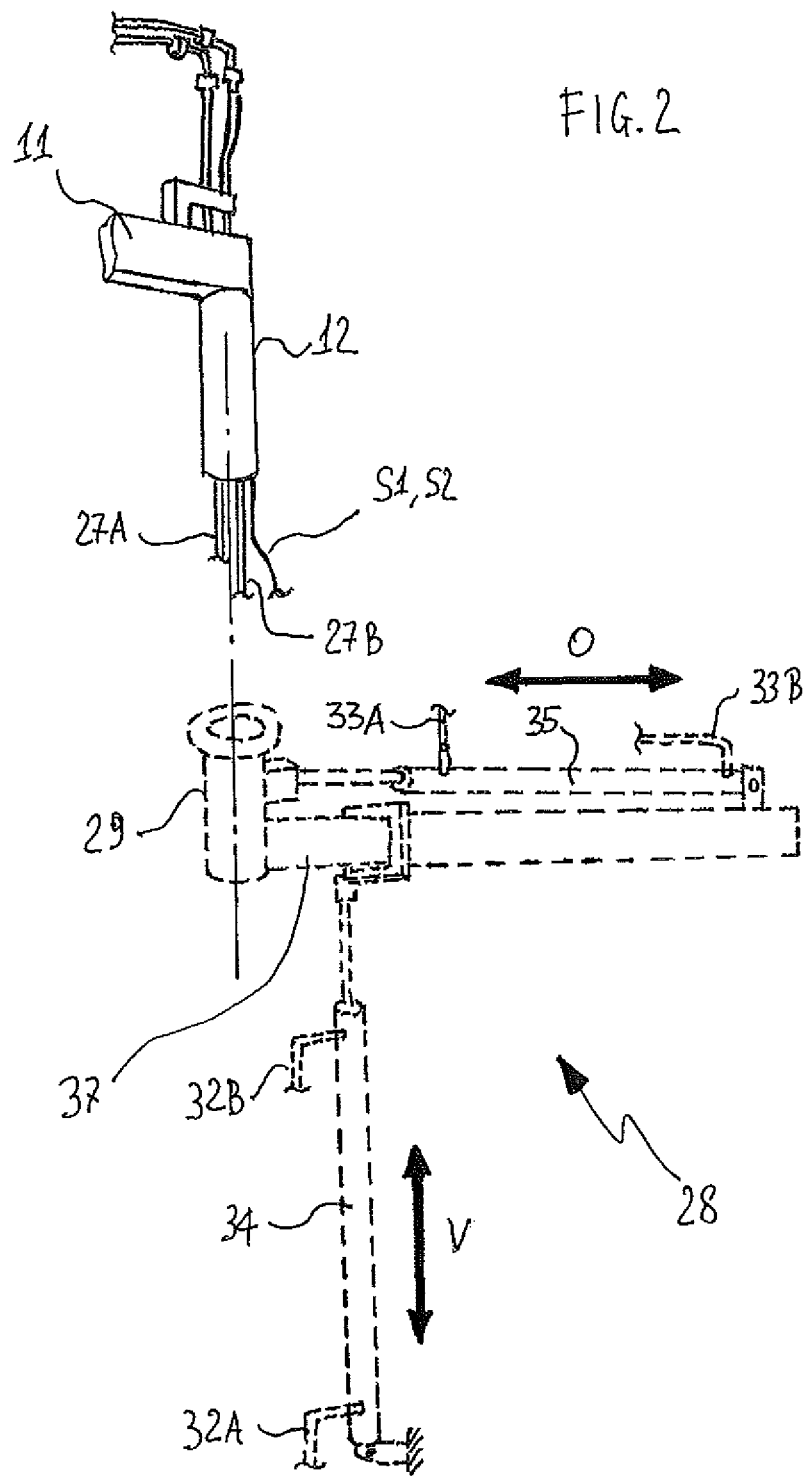
FIG. 2 shows a possible coupling means to connect an apparatus according to the invention to a farm vehicle.

With reference to FIG. 1, a first embodiment of an apparatus for mechanically displacing movable wires arranged on opposite sides of a row of plants includes a frame 1 formed by a pair of parallel uprights 2, 3 joined by a cross element 4 so as to define a space 5, open at the bottom and delimited at the top by the cross element 4, that can be made to travel without substantial interference along the longitudinal extension of the row of plants. On the cross element 4 are pivoted the first ends 8 of arms 6 of an articulated quadrilateral frame 7. The second ends 9 of the arms 6 are pivoted on brackets 10 fastened to a support body 11 so that the entire frame 1 is cantilevered on that support body 11. The latter is provided with a connector 12, for example in the shape of a tubular element, which, as can be seen in FIG. 2, can be rotatingly received in a base 29 provided in a support 28 that forms part of the common equipment of a farm vehicle, for example a tractor, not shown in the figures. The support 28 is shown with dashed lines in FIG. 2 because it is not necessarily a part of the apparatus covered by the invention.

Preferably, the articulated quadrilateral frame 7 is provided with a damping device 13, as for example a hydraulic or pneumatic damper, arranged between the frame 1 and the support body 11, so that the oscillations of the frame 1 with respect to the support body 11 are effectively and rapidly damped, maintaining the frame 1 in a position orthogonal to the tilled ground, thus preventing the uprights 2 and 3 from beating repeatedly against the vegetation contained within the space 5 during the operations for displacing the movable wires F from a first to a second height.

The frame 1 is provided with moving means 14 that include a pair of opposing gripping means 15, in each of which is slidingly received a movable wire F of the row of plants. Suitable sliding elements, such as for example pulleys 22, favour the sliding of the movable wires F engaged in the gripping elements 15, while conveying surfaces 24 are provided to direct the movable wires F toward the gripping elements 15.

More particularly, each gripping element 15 is mounted on one of the uprights 2, 3 through a slide element 16 sliding on the upright 2, 3 that serves as a guide. The position of the gripping element 15 on the upright 2, 3 on which it is mounted is fixed by blocking the sliding movement of the slide element 16 on the respective upright 2, 3 through locking means 17, consisting for example of a pin or of screws. As will be extensively described later, in this first embodiment of the invention the positioning of the gripping elements 15 on the respective uprights 2 and 3 is set at the start of the operations for displacing the movable wires F and maintained constant through the course of these operations. The movement in the direction orthogonal to the ground will in fact be produced by lifting/lowering the entire frame 1 by means of the farm vehicle to which is associated the apparatus according to the present invention.

Figure 3:
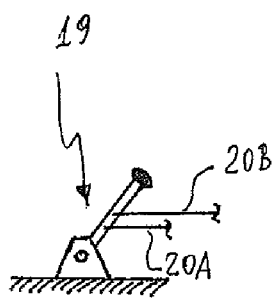
FIG. 3 shows a lever for operating the means for locking the movable wires on gripping elements of the apparatus of FIG. 1.

The gripping elements 15 are advantageously provided with locking means 18 that prevent the release of the movable wires F from the gripping elements 15. The locking means 18 can consist of a pin that fits into a slit in which the movable wires F are slidingly received. Each locking means 18 can, for example, be operated with a lever control 19, shown in FIG. 3, that acts on cables 20A and 20B connected to the locking means 18. The lever control 19 can be advantageously fixed on a farm vehicle on which the apparatus according to the first embodiment of the invention is to be mounted or assembled. Naturally, other types of known mechanical or hydraulic control means can equally be used, instead of a lever. A further example of control device will be described later with reference to a second embodiment of the present invention.

The moving means 14 include actuating means 21, consisting for example of hydraulic pistons, to displace the gripping elements 15 from a first position in which the latter are spaced apart (see FIG. 1) and a second position in which the gripping elements 15 are moved closer to each other. In the first position of the gripping elements 15, the movable wires F are at the maximum distance from each other, while in the second position of the gripping elements 15 the movable wires F are at the minimum distance or even in contact with each other. To enable the displacement of the gripping elements 15 by the effect of the actuating means 21, each slide element 16 is provided with a telescopic structure 23 configured and arranged so as to extend in a direction substantially orthogonal to the prevalent extension of the uprights 2 and 3.

Figure 6:
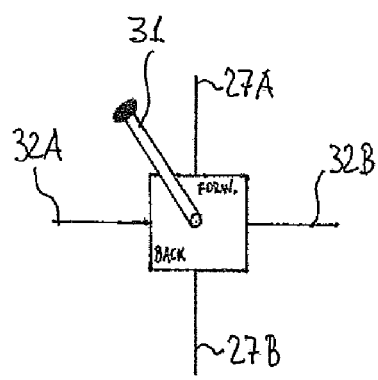
FIG. 6 shows a hydraulic valve for controlling the directions of movement of the displacement cycle for the movable wire.

The operation of the actuating means 21, which involves a displacement along a substantially horizontal axis, that is, parallel to the tilled ground, is controlled through a hydraulic circuit. In particular, two pairs of conduits 25A, 25B and 26A, 26B are arranged in fluid communication with a further pair of conduits 27A, 27B. The conduits 27A, 27B are connected to the hydraulic system present as standard equipment on any farm vehicle of known type, not shown in the figures, through a diversion valve 30 shown schematically in FIG. 6, operated through a lever 31. To the valve 30 are in fact also connected two conduits 32A, 32B, belonging to the hydraulic circuit of the farm vehicle, which supply with fluid an actuator 34 (FIG. 2) to displace the base 29 of the support 28 in a direction "V" substantially orthogonal to the tilled ground. Through the lever 31 of the valve 30 it is possible to control the direction of movement (schematically indicated in FIG. 6 with the words "FORW" and "BACK" of the actuating means 21 and, consequently, the movement of the movable wires F. Thanks to the valve 30 that puts the conduits 27A, 27B of the hydraulic circuit of the apparatus of a first embodiment of the invention in fluid communication with the conduits 32A, 32B of the hydraulic system of the farm vehicle, the movements of the actuating means 21 and of the actuator 34 (FIG. 2) are sequential and synchronized. In fact, when the gripping elements 15 reach their second position, that is, they are near to each other, the pressure of the fluid circulating in the conduits 27A, 27B increases and activates the actuator 34. In this manner, it will not be necessary to provide particular electric/electronic controls to coordinate the movements of the gripping elements 15 along two axes at right angles to each other, one substantially parallel to the tilled ground (movement applied by the actuating means 21) and the other substantially perpendicular to the ground (movement applied to the whole frame 1 by the actuator 34 of the farm vehicle).

In FIG. 2, the support 28 is provided with a further actuator 35 fed by two conduits 33A and 33B of the hydraulic system of the farm vehicle. The actuator 35, which similarly to the actuator 34 may consist of a hydraulic piston, is used to move the base 29 of the support 28, and consequently the entire frame 1 of the apparatus of the invention, in a direction parallel to the ground and indicated with "O" in FIG. 2. For this purpose, the base 29 is integral to a telescopic arm 37.

Figure 4:
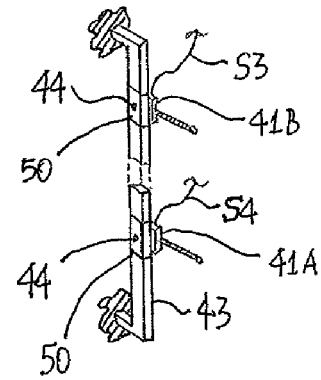
FIG. 4 shows sensing means for controlling an apparatus according to the invention.

With reference to FIGS. 1 and 4, to enable the automatic operation of the apparatus according to a first embodiment of the invention, the apparatus can be provided with sensing means 36A, 36B mounted, respectively, on an upright 2, 3 of the frame 1 to detect the presence of a pole in the row of plants. The sensors 36A, 36B substantially detect the moment when the frame 1 is about to receive a pole of the row of plants within the space 5. Advantageously, the sensing means 36A, 36B are mounted on the uprights 2, 3 from the side opposite the gripping elements 15, so that an approaching pole in the row can be detected before the gripping elements 15 reach it or move past it. The sensing means 36A, 36B can be mounted in a similar manner as described with reference to the gripping elements 15, or through sliding means 38 slidingly received on the uprights 2, 3. Locking means 39, consisting for example of a pin or screws, make it possible to lock the sensing means 36A, 36B on the relative uprights 2 and 3. Guiding surfaces 40 are provided to direct the vegetation in predetermined positions and signal lines S1 and S2 connect the sensing means 36A, 36B to a control panel 42, shown schematically in FIG. 5, for controlling the apparatus. The signal lines S1 and S2, together with the conduits 27A, 27B of the hydraulic circuit, are provided for the connection, respectively, to the control panel 42 and to the hydraulic system of the farm vehicle through a cavity of the connector 12.

With reference to FIG. 4, additional sensing means 41A and 41B are provided to detect the position of the gripping elements 15 by sensing the position of the frame 1 in a direction perpendicular to the ground, that is, in a vertical direction. Advantageously, the sensing means 41A and 41B can be slidingly mounted one after the other, and at a desired distance, on a bar 43 by means of sliding means 50. The bar 43 will be applied in the area of operation of the telescopic arm 37 of the support 28 in a direction parallel to the vertical direction "V" shown in FIG. 2. The position of the sensing means 41A and 41B on the bar can be adjusted with locking means 44, consisting, for example, of a pin or of screws. In particular, the bar 43 can in turn be mounted on the farm vehicle to which the apparatus according to the present invention is associated or integrated. The distance between the sensing means 41A and 41B defines the start and stop points of the movement of the telescopic arm 37 in the direction "V" of FIG. 2 and, consequently, the movement of the base 29 and of the whole frame 1.

The sensing means 41A and 41B are placed in signal communication with the control panel 42 (FIG. 5) through signal lines S3, S4.

Figure 5:
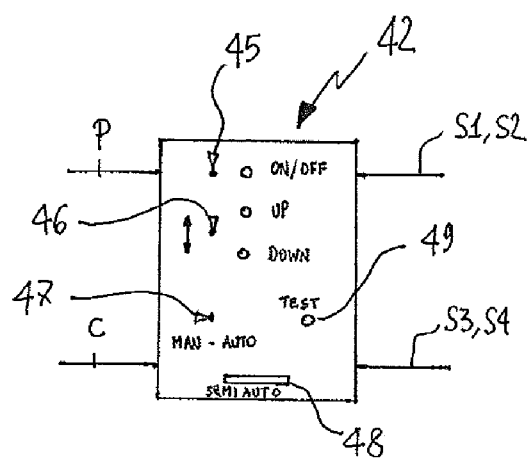
FIG. 5 shows a control panel for controlling the apparatus of FIG. 1.

With reference to FIG. 5, the control panel 42 to be installed on the farm vehicle to which the apparatus according to a first embodiment of the present invention is associated or integrated, in addition to the signal lines S1, S2 and S3, S4 is also electrically connected to a source of energy through an electric line "P" and to suitable electrical control devices provided on the hydraulic system of the farm vehicle for controlling the actuators 34 (FIG. 2) and 21 (FIG. 1) through an electric line "C".

The control panel 42 is preferably equipped with a first main ON/OFF switch 45, a second switch 46 to control the movement of the frame 1 in the two directions (UP/DOWN) of the vertical arrow "V" shown in FIG. 2 by means of the actuator 34, a third switch 47 to select the manual or automatic operation of the apparatus. The switch 47 substantially breaks/connects the signal lines S1, S2 and S3, S4, determining respectively the manual (MAN) or automatic (AUTO) operation of the apparatus. A push button 48 (SEMIAUTO) is provided on the control panel 42 to actuate, in the manual operating mode (switch 47 positioned on MAN), the sequential and synchronized movements of the gripping elements 15 in the two orthogonal axes corresponding to a first direction substantially parallel to the ground and to a second direction perpendicular to the ground. Finally, another push button 49 (TEST) is provided to test said sequential and synchronized movement in order to check the proper operation of the components.

The operating process of the apparatus for the mechanized displacement of movable wires F arranged on opposite sides of a row of plants, in particular grapevines, according to the first embodiment of the present invention will now be described in detail. To illustrate said operating process, reference will be made to an operation of lifting two movable wires F from a first height to a second height higher than the first one from the tilled ground. The positioning of the movable wires F at the second height also envisages their engagement on suitable retaining elements placed at the second height on each intermediate pole of the row of plants.

The apparatus according to the invention, associated or incorporated in a farm vehicle so as to project orthogonally to the direction of travel of said vehicle, is first arranged so that the frame 1 presents a space 5 in a position suitable to receive the head pole and the first plant adjacent to the same pole without any interference with the uprights 2 and 3 or with the cross element 4. The control panel 42 (FIG. 5) is switched on by means of the switch 45, and the switch 47 is placed in the manual (MAN) mode of operation. The position of the frame 1 is first adjusted by means of the actuators 34 and 35 of the farm vehicle. In particular, the actuator 34 is controlled through the switch 46 on the control panel 42 by an operator seated in the driving position of the farm vehicle. Then, taking into account the position of the movable wires F and the maximum travel in the direction V of FIG. 2 that the frame 1 can cover, the positions of the moving means 14 with respect to the uprights 2 and 3 are determined by sliding the slide elements 16 and operating on the locking means 17. The moving means 14 are arranged in position opposite to each other and at the same height. The positions of the moving means 14 with respect to the uprights 2 and 3 remain unchanged during all the operations for displacing the movable wires F. If the apparatus is to operate in the automatic mode, the position of the sensing means 36A, 36B with respect to the uprights 2 and 3, as well as the position of the sensing means 41A, 41B on the bar 43 are set in a manner as previously described for the gripping elements 15, by operating on the sliding means 38, 50 and on the locking means 39 and 44, respectively. The gripping elements 15 of the moving means 14 are in their first position, that is, spaced apart from each other in a direction parallel to the tilled field.

After having first prepared the apparatus for use according to the first embodiment of the invention, the frame 1 is arranged astride the row of plants so as to position the moving means 14 for the movable wires F on opposite sides of the row and at a lower height than before. In other words, the frame 1 is moved by the farm vehicle, which moves forward between two adjacent rows along the rows until the head pole is received inside the space 5. At this point, the gripping elements 15 are brought to their second position, that is, next to each other at a slightly higher level than the initial height of the movable wires F. The latter, thanks to the conveying surfaces 24, are received in, and associated therein, the gripping elements 15. Through the locking means 18, actuated by the operator through the lever 19 (FIG. 3), the movable wires F remain connected to the gripping elements 15 during all the wire displacement operations. Next, the gripping elements 15 are again moved apart from each other by operating on the actuating means 21. This brings about a spreading of the movable wires F along an axis parallel to the ground, so as to allow the frame 1 to be moved forward while reducing to a minimum the interference of the moving means 14 with the vegetation.

After having completed said preparatory operations, the apparatus can perform the mechanized displacement of the movable wires F from a first level to a second level, which in this description is assumed to be higher than the first (lifting of the movable wires F). Evidently, if the second height were lower than the first one, the operations to be carried out by the apparatus according to the invention would be easy to appreciate by an expert in the field from the description, which follows.

The farm vehicle, and thus the frame 1, are moved forward along the row of plants until the frame 1 comes near an intermediate pole of said row of plants, keeping the gripping elements 15, and consequently the movable wires F, at a level slightly higher than the level at which they are to be placed. In particular, when the frame 1 is about to engage one of the intermediate poles in the row of plants or is positioned just above the pole, the movable wires F are lifted by acting on the actuator 34 through the switch 46 on the control panel 42. With this lifting, the movable wires F are brought to a pre-positioning level that is slightly higher than the level al which said wires will have to be set at the end of the displacement operation. The pre-positioning level takes into account the vertical extension of the hooks arranged on each intermediate pole and defining the levels of possible positioning of the movable wires F. The placing of the movable wires F at the pre-positioning level is carried out through a first sequential and synchronized displacement of the gripping elements 15 along an axis substantially orthogonal to the tilled ground.

To simplify the steps for displacing the movable wires F, and to favour the positioning of said wires F at the pre-positioning height, before the frame 1 is brought near the first intermediate pole on the row of plants, the gripping elements 15 associated with the wires F can first be brought near the second height at which the wires F will have to be finally laid, by acting on the actuator 34 through the switch 46 on the control panel 42.

The positioning of the movable wires F at their definitive height is completed by moving the frame 1 forward to just past the intermediate pole involved by the displacement the height of the wires F and pressing the button 48 on the control panel to carry out a further sequential and synchronized displacement of the gripping elements 15 along two axes at right angles to each other, or along a first axis substantially parallel to the ground and a second axis orthogonal to the ground. In particular, the gripping elements 15, which are at the pre-positioning height, are first brought to their second position, that is, one beside the other, by operating on the actuating means 21 to produce a corresponding movement of the movable wires F toward each other. When the gripping elements 15 reach their second position, the pressure of the fluid circulating in the conduits 27A, 27B increases, causing the activation of the actuator 34, which lowers the gripping elements 15 along an axis substantially orthogonal to the ground. At the end of this second displacement, the movable wires F will be held on a hook provided on the intermediate pole and placed at the definitive height at which the wires are to be positioned. After the wires F have been set in place, the gripping elements 15 are brought back to their first position, that is, they are spaced apart from each other with a movement along an axis substantially parallel to the tilled ground made through the actuating means 21. At this point, the gripping elements 15 will be ready to move the wires F to the next intermediate pole according to the sequence of movements previously described.

The sequential and synchronized movements of the gripping elements 15 can be accomplished by operating according to a manual procedure (switch 47 set on MAN), and by operating in the automatic mode (switch 47 set on AUTO).

According to the manual mode of operation, the operator will have to advance the farm vehicle along a row of plants and perform a first displacement of the gripping elements 15 along an axis substantially orthogonal to the ground just before the frame 1 reaches the intermediate pole of the row involved by the displacement of the wires F, and will slow down the farm vehicle whenever the frame 1 reaches a position slightly past said pole. In this last position, the operator can press the button 48 to complete the fastening of the movable wires F at their intended height. This mode of operation allows the operator to manually update the height of the gripping elements 15 by lifting and/or lowering the frame 1 by means of the switch 46 on the control panel 42 that controls the actuator 34. In this manner, the operator can easily take into account the unevenness of the tilled ground.

The periodic slowing downs of the farm vehicle in the vicinity of each intermediate pole in the row are eliminated in the automatic mode of operation. In this case, the sensing means 36A, 36B and 41A, 41B are active and communicate to the control panel 42 the presence of an intermediate pole in the vicinity of the frame 1, and the position of the frame 1 itself, and consequently the position of the gripping elements 15, according to a direction perpendicular to the ground, and thus the operator will be able to proceed with the vehicle without interruptions and to lead the frame 1 along the whole length of the row. The operation of displacement of the movable wires F will be carried out automatically for each of the poles on the row.

When the displacement of the movable wires F is completed along the whole length of the row, the wires F are released from the gripping elements 15 by actuating the locking elements 18 by means of the lever 19 (FIG. 3), thus separating the apparatus from the row.

To make the apparatus according to the invention more practical and easier to use, especially in the automatic mode of operation, it is possible to make some modifications on the previously described components by applying the following indications.

Specifically, in a variant embodiment of the apparatus according to the invention, the support body 11 includes a mechanical articulated joint that substantially divides it in two portions. These portions extend along the same axis, or along parallel axes, and are rotatingly coupled so that one of said portions can rotate around the extension axis of the other portion. Similarly to what is illustrated in FIG. 2, one of said portions is provided with a connector that can be rotatingly received in a base 29 provided in a support 28 that forms part of the common equipment of a farm vehicle, for example a tractor. A second portion of the support body 11 supports the brackets 10 of the articulated quadrilateral frame 7 shown in FIG. 2. The joint between the two portions of the support body can be equipped with an elastic element that favours the rotation of the second portion with respect to the first portion toward a predefined balanced position. In addition, the relative position of the two portions of the support body 11 can be adjusted by means of a suitable hydraulic actuator controlled manually through a further switch on the control panel 42 or automatically.

This variant embodiment of the support body 11 allows the frame 1 to rotate around an axis substantially parallel to the ground and orthogonal to the lengthwise direction of the row of plants. Thus it is possible to keep the frame 1 as orthogonal as possible to the ground, compensating for any unevennesses of the ground (particularly differences in height in the lengthwise direction of the row of plants) that the farm vehicle to which the equipment is associated or incorporated is likely to encounter.

According to a further embodiment of the apparatus of the invention, to simplify the operation in the manual mode, the sensing means 36A and 36B, instead of being installed on the uprights 2 and 3 of the frame 1, can be arranged one after the other in the lengthwise direction of the row on an element that can be fixed to the frame of a farm vehicle. The positions of the sensing means 36A and 36B are such that a first sensor 36A is mounted in front of the frame 1 and the second sensor 36B is placed rearwardly of the frame, or the sensing means 36A and 36B are mounted on opposite parts with respect to the frame 1. With such embodiment, when the farm vehicle brings the apparatus near an intermediate pole of the row of plants, and the automatic operating mode is switched on, a first sensor 36A detects the presence of said pole and activates the actuator 34, which displaces the gripping elements 15 in a sequential and synchronized manner along an axis substantially orthogonal to the ground, bringing the movable wires F to a previously described pre-positioning height. The activation of the second sensor 36B by the intermediate pole of the row by effect of the forward movement of the frame 1 in the lengthwise direction of the row indicates that the frame itself has moved past the pole and that therefore the fastening of the movable wires F at their final height can be completed. The completion of the fastening of the wires on the intermediate pole of the row is carried out as previously described, that is, by displacing the gripping elements 15 in a sequential and synchronized manner by means of two movements in opposite directions along an axis substantially parallel to the ground and orthogonal to the lengthwise direction of the row, said two movements being separated by a further displacement of the gripping elements 15 along an axis substantially orthogonal to the ground.

In a further embodiment of the apparatus according to the invention, the cross element 4 can be fastened to the support body 11 in a rotating manner through a simple pin around which the entire frame 1 rotates. In this manner, the articulated quadrilateral frame 7 is eliminated, and the weight of the apparatus is reduced, thus favouring the portability of the apparatus.

According to a still further embodiment, to compensate for the differences in height of the ground and thus to favour the automatic operation of the apparatus, it is possible to install a hydraulic actuator on the bar 43 that supports the second sensing means 41A and 41B for detecting the position of the gripping elements 115 by sensing the position of the frame 1 in a direction perpendicular to the ground. The actuator, controlled by a suitable switch on the control panel 42, enables an operator to displace the bar 43 vertically to adjust its position with respect to the ground, based on the configuration of the ground.

A further improvement of the apparatus according to the invention envisages a control panel 42 provided with a programmable logic controller (PLC) that processes the signals received from the sensing means 36A, 36B, 41A and 41B and runs a program driving the actuators installed in the apparatus, or the actuators 21 of the gripping elements 15 (FIG. 1), the actuators 34 and 35, respectively, for the vertical and horizontal displacement of the frame 1 (FIG. 2), the actuator mounted on the bar 43 for adjusting the vertical position of the second sensing means 41A and 41B that detect the vertical position of the gripping elements 115 by sensing the vertical position of the frame 1, and the actuator mounted on the joint on the support body 11 to adjust the relative position of the two coupled rotating portions that form it. In particular, the operation of the actuators 21 and 34 will be sequential, that is, according to a predefined sequence, and synchronized, that is, paced at suitable time intervals. By means of the PLC controller, the actuators 34, 35 and/or 21 can also be controlled manually through one or more joysticks installed on the control panel 42.

Figure 7:
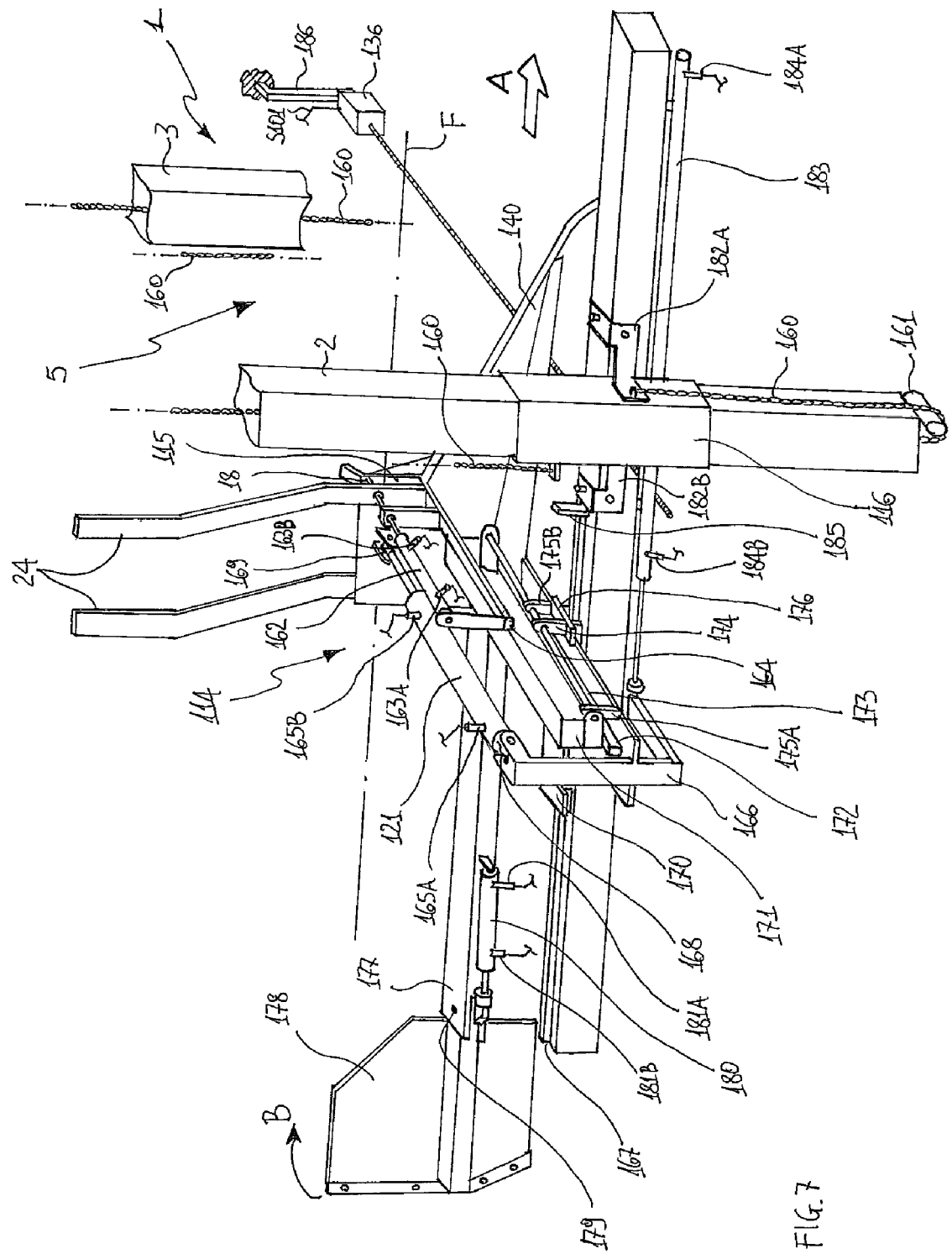
FIG. 7 shows a detail of a second embodiment of an apparatus according to the present invention.

Referring now to FIG. 7, a second embodiment of an apparatus according to the present invention is described, wherein the apparatus can be associated to a support 28 (FIG. 2) of a farm vehicle in a manner similar to what was described with reference to the first embodiment of the invention. In this second embodiment, the elements in common with the first embodiment will be indicated with the same numeral references or with corresponding numeral references, and the description of their operation and of their structure will not be repeated.

The apparatus according to the second embodiment, in a manner substantially similar to what is illustrated in FIG. 1 with reference to the first embodiment, includes a frame 1 provided with a pair of uprights 2, 3 joined by a cross element so as to define a space 5, open at the bottom and delimited at the top by the cross element, that can be made to travel without substantial interference in the lengthwise direction of the row of plants. In this second embodiment, the frame 1 is provided with moving means 114 that include a first pair of opposing gripping elements 115, in each of which is slidingly received a movable wire F of the row of plants. In FIG. 7, for simplicity of illustration, only one of the two moving means 114 is shown, as the other one is substantially identical and mounted in a manner that is a mirror image of the one shown. Conveying surfaces 24 are provided to guide the movable wires F toward the gripping elements 115.

More particularly, each gripping element 115 is mounted on one of the uprights 2, 3 through a slide element 116 that slides on the upright 2, 3 that serves as a guide. The position of each gripping element 115 on the upright 2, 3 on which it is mounted is fixed by operating on the chain 160 that is partially wound around pulleys 161 (only one of these pulleys 160 is visible in FIG. 7) arranged at the ends of each upright 2, 3 and the ends of which are fastened to the sliding element 116. The movement of the chain can be provided, for example, by an electric motor mounted on the frame 1 and provided with a sprocket wheel that meshes with the chain 160. The gripping elements 115 are advantageously provided with locking means 18 that prevent the release of the movable wires F from the gripping elements 115. The locking means 18 may consist of a pin inserted in a slit in which are slidingly received the movable wires F.

In this second embodiment, each locking means 18 can, for example, be activated in a direction transversal to the extension of the movable wires F by means of a pneumatic actuator 162 provided with a pair of aeraulic conduits 163A, 163B for its operation. The actuator 162 is mounted on a support 164 that sustains the guide surfaces 24 of the movable wires F and that is in turn connected to a guide surface 140 provided to guide the vegetation in predetermined positions.

The moving means 114 include actuating means 121, consisting of pneumatic pistons, to displace the gripping elements 115 between a first position in which the latter are spaced apart from each other and a second position in which the gripping elements 115 are brought near to each other. In the first position of the gripping elements 115, the movable wires F are at a maximum distance from each other, while in the second position of the gripping elements 115 the movable wires are at the minimum distance or even in contact with each other. Said pneumatic pistons are operated through a pair of aeraulic conduits 165A, 165B. A first end 168 of the pneumatic pistons making up the actuating means 121 is mounted in a support element 166 which, as will be better explained later, is integral to a sliding element 170 that slides on a guide 167 extending along the movable wires F and is stably fixed to the slide element 116. A second end 169, corresponding to the end of the sliding stem of the pneumatic pistons, is connected to the guide surface 140 so that the latter is mobile jointly with the gripping elements 115.

To allow the simultaneous displacement of the gripping elements 115 and of the guide surface 140 by the effect of the actuating means 121, a slide element 171 associated with the surface 140 is mounted so as to slide on a guide 172 formed on the support element 166 so as to extend in a direction substantially orthogonal to the direction of extension of the movable wires F.

A travel limit 173 defines the travel distance of the slide element 171 that allows the simultaneous sliding of the gripping elements 115, the foliage guiding surfaces 140, the movable wire conveying surfaces 24 and the relative support 164 that supports the actuator 162 in a direction substantially orthogonal to the direction of the movable wires F and substantially parallel to the ground on which the row of plants is arranged. The travel limit 173 is fixed on the slide element 171 and consists preferably of a bar received so as to slide within a support 174 fastened to the slide element 170 that allows the translation of the support element 166 in a direction substantially parallel to the movable wires F. The travel limit 173 is further provided with two stops 175A, 175B, which, moving in a direction substantially at right angles to the movable wires together with the slide element 171, abut against a projection 176 formed on the support element 166 near the slide element 170 and stop on said projection 176, thus determining the travel limit of the slide element 171, and, consequently, of the gripping elements 115. In FIG. 7, the stop 175B is shown in the position of contact with the projection 176, since the gripping element 115 is in the first position, where the movable wires F are spaced at the maximum distance from each other.

On the slide element 171 that allows the sliding of the gripping elements 115 is connected a bracket 177 that extends in a direction substantially parallel to the movable wires F and at right angles to the slide element 171. The bracket 177 also extends in the direction opposite the direction of the arrow "A" in FIG. 7, which corresponds to the forward direction of the apparatus according to the invention during the operations for displacing the movable wires F.

Preferably, on the end of the bracket 177 opposite the end fastened to the slide element 171 is hinged a fin 178 that can rotate between an idle position (shown in FIG. 7), in which the fin 178 is parallel to the uprights 2, 3 and to the direction of travel of the apparatus shown by the arrow "A" during the operations for displacing the movable wires F, and an operating position in which the fin 178 is set transversally to said direction of travel "A" by rotating it toward the upright 3. The direction of rotation of the fin 178 around the pin 179 is indicated by the arrow "B" on FIG. 7. In mirror-image fashion, the fin on the moving means 114 arranged on the upright 3, and not shown in FIG. 7, will rotate toward the upright 2 and move close to the other fin 178. As will be described later, the fins 178 are used to keep the wires F engaged in the gripping elements 115 near the intermediate pole in the row as they are being displaced from a first height to a second height above the ground.

The rotation of the fin 178 around the pin 179 is provided by an actuator 180, preferably in the form of a pneumatic piston provided with a pair of aeraulic conduits 181A, 181B. The movement of the fins 178 provided on the moving means 114 is coordinated sequentially with the movement of the gripping elements 115.

As already mentioned, the support element 166 is integral with a slide element 170 that runs on a guide 167 extending in the direction of the movable wires F. By means of fastening bodies 182A and 182B, the guide 167 is stably fastened to the slide element 116 that slides on the upright 2. The guide 167 extends mainly in the direction opposite the direction of the arrow "A" in FIG. 7 which corresponds to the direction of movement of the apparatus according to the invention during the operations for displacing the movable wires F. The displacement of the whole support element 166 and thus of the gripping elements 115 along the extension of the movable wires F is provided by means of an actuator 183, preferably consisting of a pneumatic piston provided with aeraulic conduits 184A and 184B for its stroke movements. The actuator 183 is controlled through the aeraulic conduits 184A and 184B to move the gripping elements 115 away from and then closer to the uprights 2, 3. The travel of the whole support element 166 and thus of the gripping elements 115 away from the uprights 2, 3 is limited to the maximum extension of the actuator 183, while the travel toward the uprights 2, 3 is limited by a stop 185 fastened on the guide 167.

Therefore, in this second embodiment of the apparatus, the gripping elements 115, in addition to the movements already described with reference to the first embodiment of the invention, can also be moved lengthwise along the movable wires F, keeping them engaged within the slit that receives them. This further movement significantly improves the possibility of automating the operations of displacing the movable wires F from a first height to a second height from the ground. In fact, the travel of the gripping elements 115 away from the uprights 2 and 3 makes it possible to keep said gripping elements 115 near the intermediate pole of the row of plants on which the movable wires F are to be positioned for a longer time while the whole frame 1 that receives the row of plants in the space 5 advances without interruptions in the direction "A" of FIG. 7.

It should also be noted that in this second embodiment of the apparatus according to the invention, the displacement of the gripping elements 115 in a direction substantially orthogonal to the ground can be made in two ways. A first way is as already described with reference to the first embodiment of the apparatus, in other words, by maintaining the position of each gripping element 115 constant with respect to the relative upright 2, 3 which supports it and by lifting the whole frame 1 by means of the actuating device 34 illustrated in FIG. 2 and with the possible help of the sensing means 41A and 41B shown in FIG. 4. A second mode of operation involves, instead, moving the gripping devices 115 by sliding them along the respective uprights 2, 3 by operating on each chain 160 associated with the relative slide element 116, while maintaining the position of the frame 1 constant with respect to the ground.

The second embodiment of the apparatus according to the invention is provided with sensing means 136 that substantially detect the moment when the frame 1 has just gone past a pole in the row of plants. Advantageously, the sensing means 136 are mounted on an element 186 that can be fastened to the frame of a farm vehicle. The element 186 makes it possible to adjust the position of the sensing means 136 in a direction at right angles to the direction of the movable wires so that a pole in the row that comes to be between the uprights 2, 3 is always intercepted by the sensitive part of the sensing means 136. The sensing means 136 also come to be in a position rearward of the frame 1 along its direction of movement indicated by the arrow "A" in FIG. 7. The sensing means 136 are provided with a signal line S101 that signals the presence of an intermediate pole in the row and thus starts the displacement of the movable wires F from a first height to a second height above the ground, as will be described here later.

The process of operation of the second embodiment of the invention for the mechanized repositioning of movable wires F arranged on opposite sides of a row of plants, in particular grapevines, will now be described in detail. In a manner similar to what was described with reference to the first embodiment, to illustrate said process of operation, the description will refer to an operation of lifting two movable wires F from a first height to a second height higher than the first one from the ground. The positioning of the movable wires F at the second height also foresees their engagement on suitable retaining elements placed at the second height on each intermediate pole in the row. Evidently, if the second height is lower than the first height, the operations that the frame according to the invention must carry out will be easily appreciated by a person skilled in the field from the following description.

For a simpler explanation, in the following description the repositioning of the gripping elements 115 in a direction orthogonal to the ground on which the row of plants is installed is carried out by moving the whole frame 1 by means of the actuating means 34 (FIG. 2) and controlling the extent of said movement through the sensing means 41A and 41B shown in FIG. 4.

The apparatus of the invention, connected to or incorporated in a farm vehicle so as to project therefrom orthogonally to the direction of travel of said vehicle, is first arranged so that the frame 1 has the space 5 in a position suitable to receive the head pole in the row and the first plant adjacent to the same pole without any interference with the uprights 2 and 3 or with the cross element between the uprights 2 and 3. The position of the frame 1 is first adjusted through the actuators 34 and 35 of the farm vehicle. Subsequently, taking into account the position of the movable wires F and the maximum distance in the direction V in FIG. 2 that the frame 1 can travel, the positions of the moving means 114 with respect to the uprights 2 and 3 are determined by moving the slide means 116 by operating on the chains 160 by means of an electric motor provided with a sprocket wheel that meshes with the relative chain 160. The moving means 114 are arranged in positions opposite to each other and at the same height. As previously mentioned, described in simple terms, the positions of the moving means 114 with respect to the uprights 2 and 3 remain unchanged during all the operations for displacing the movable wires F. The position of the sensing means 136 is also adjusted in a direction orthogonal to the extension of the movable wires F so that the sensitive part of the sensing means 136 intercepts a pole in the row as soon as the frame 1 travels past it. The positions of the sensing means 41A, 41B on the bar 43 (FIG. 4) are also adjusted by operating on the slide means 50 and on the stop 44, respectively. The gripping elements 115 of the moving means 114 are in their first position, that is, spaced apart from each other in a direction parallel to the ground.

After having completed the above operations, the frame 1 is arranged astride the row of plants so as to position the moving means 114 of the movable wires F on opposite parts of the row and at a height lower than the height of the movable wires F. In other words, the frame 1 is moved by the farm vehicle advancing in the lengthwise direction between two rows of plants until the head pole in the row is received within the space 5. At this point, the gripping elements 115 are brought to their second position, that is, one near the other at a level slightly higher than the initial height of the movable wires F. The wires, thanks to the conveying surfaces 24, are received in and associated with the gripping elements 115. Through the locking means 18, activated by the operator by means of the actuator 162, the movable wires F remain associated with the gripping elements 115 during all the operations of repositioning the movable wires F on a row. Subsequently, the gripping elements 115 are again spaced apart from each other by acting on the actuating means 121. This results in a spreading apart of the movable wires F along an axis parallel to the ground, so as to allow the frame 1 to move forward while reducing to a minimum the interference of the moving means 114 with the vegetation.

At this point, the gripping elements 115, and consequently the movable wires F, are brought to a level slightly higher than the height from which they are to be displaced. This height is adjusted manually, at the first intermediate pole of the row that the frame 1 comes upon, by acting on the actuator 34 (FIG. 2) until the telescopic arm 37 of the support 28 is brought near the sensor 41B (FIG. 4). This height corresponds to the prepositioning height mentioned above, that is, at a level slightly higher than the height at which the movable wires will have to be positioned at the end of the displacement operation. The prepositioning height takes into account the vertical extension of the retainers that are applied or formed on each intermediate pole in the row and define the levels of possible positioning of the movable wires F.

At this point, during the movement of the frame 1 along the row of plants by means of the farm vehicle in the direction of the arrow "A" in FIG. 7, the passage of the frame 1 past an intermediate pole activates the sensing means 136, which set the apparatus into operation through the signal line S101.

The gripping elements 115 that engage the movable wires F are brought to their second position, that is, next to each other, through a sequential and synchronized displacement along an axis substantially parallel to the ground obtained by operating each of the actuators 121. After this movement, which comes about at the above-mentioned prepositioning height, the gripping elements 115 are brought between the uprights 2, 3 and the intermediate pole just passed by the frame 1. In addition, the fins 178 of each moving means 114 move closer to one another. At the same time as the activation of the actuators 121, or immediately after the gripping elements 115 have started to move, the actuators 180 that control the rotation of the fins 178 toward each other are also activated, thus fastening the wires F in the vicinity of the pole on which they are to be fastened.

As soon as the gripping elements 115 reach their second position (the stop 175A abuts against the projection 176 formed on the support element 166), and continuing to advance with the farm vehicle while keeping the gripping elements 115 in said second position, the actuators 183 of each moving means 114 are activated to displace each support element 166 and thus the gripping elements 115 in the direction opposite to the direction of travel of the frame 1 along an axis parallel to the ground. Thanks to this movement opposite the direction of travel of the frame 1 along the row, the gripping elements 115, drawn by the farm vehicle which continues to move forward without interruptions and at a rate faster than the maximum speed achievable for the correct operation of the first embodiment of the apparatus, can remain near the intermediate pole on which the movable wires F are to be repositioned for a time of sufficient length to complete their displacement.

At the same time as the activation of the actuators 183, or immediately after the gripping elements 115 have started their movement, the actuator 34 (FIG. 2) is also activated to displace the frame 1, and the gripping elements 115 integral to it, from the prepositioning height to the final height of the movable wires F, in other words, the new height at which the wires F are to be repositioned. The controlled displacement of the actuator 34 occurs along an axis orthogonal to the ground, that is, in the direction "V" shown in FIG. 2, and in this illustrative description, the movement of the gripping elements 115 is toward the ground.

Therefore, the substantially simultaneous activation of the actuators 183 and 34 produces a sequential and synchronized displacement of the gripping elements 115 along two axes, one substantially parallel to the ground and the other perpendicular to the ground. Such displacements complete the fastening of the movable wires F at their final height on an intermediate pole in the row.

Subsequently, the apparatus is operated so as to return the gripping elements 115 to their starting position, shown schematically in FIG. 7. This is achieved by displacing the gripping elements 115 from their second position to their first position, that is, by bringing the gripping elements 115 to their maximum distance while keeping the movable wires F constantly engaged. The reciprocal displacement of the two gripping elements 115 is carried out by activating the actuators 121 again along an axis parallel to the ground. At the same time as the activation of the actuators 121 the actuators 180 are also activated to reciprocally spread the fins 178 apart by a rotation of the respective pins 179.

After the gripping elements 115 have reached their first position, or are close to reaching that position, the actuators 183 are activated again to bring the gripping elements 115 near the uprights 2, 3 by moving them in the direction of the arrow "A" in FIG. 7. At the same time as the activation of the actuators 183, or immediately after the displacement of the gripping elements 115 has started to bring them toward the uprights 2, 3, the actuator 34 is also activated to return the gripping elements 115 to the prepositioning height, starting from the final height of the movable wires F.

At the end of these displacements, the apparatus is prearranged to repeat the repositioning of the movable wires F by displacing them from a first height above the ground and reattaching them to the intermediate poles in the row at a second height different from the first one.

Naturally, the coordinated operation of the actuators 34, 121, 180, 183 will be supervised by a programmable logic controller (PLC) or by another suitable control system such as, for example, an electro-mechanical control unit; in addition, the actuators 121, 180, 183 and 162 make up portions of a pneumatic circuit fed by suitable pumping means.

Figure 8:
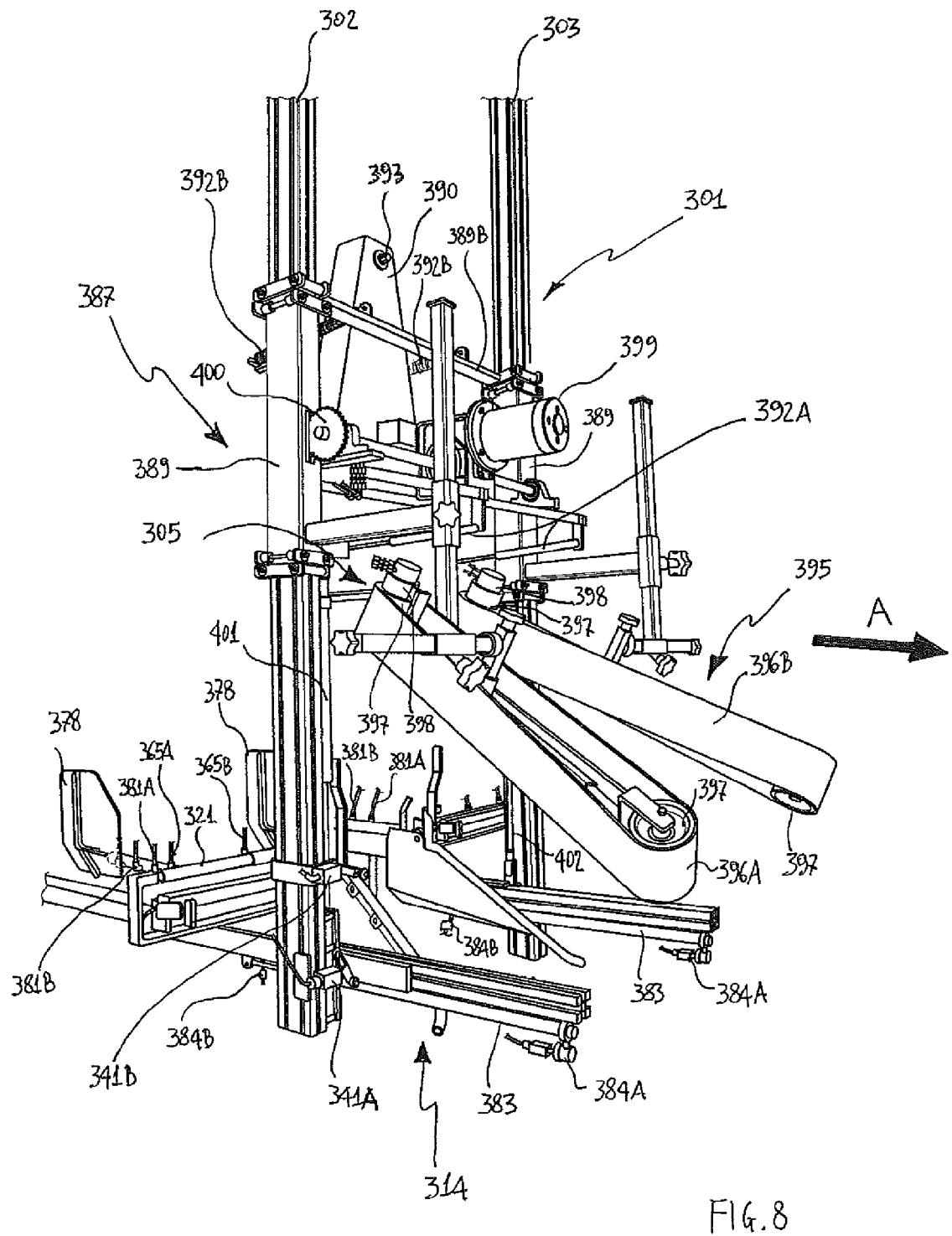
FIG. 8 shows a detail of a third embodiment of an apparatus according to the present invention in a front perspective view.
Figure 9:
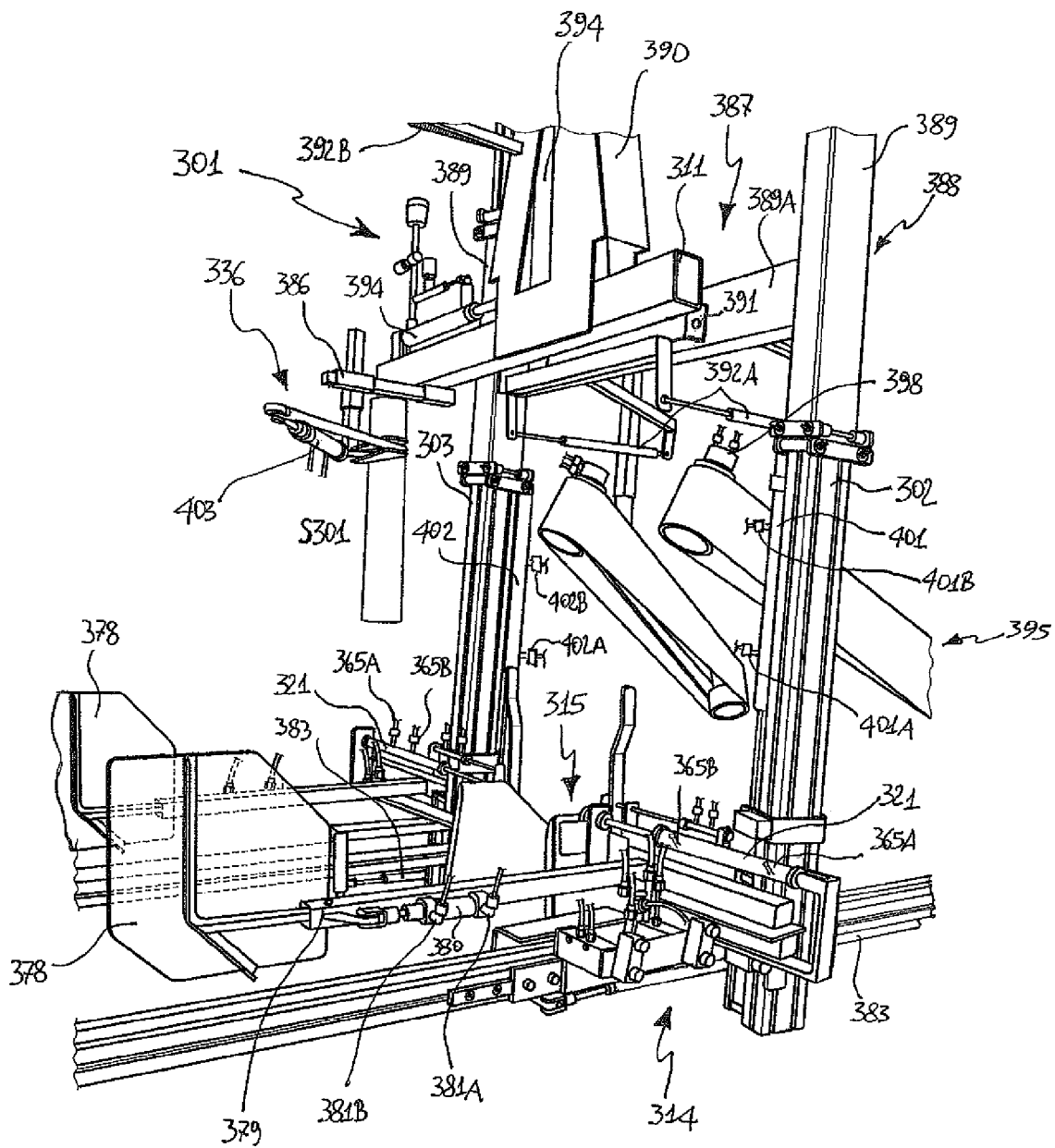
FIG. 9 shows the machine of FIG. 8 according to a rear perspective view.

Referring now to FIGS. 8 and 9, a description is given of a third embodiment of an apparatus according to the present invention that can be associated to a support 28 (FIG. 2) of a farm vehicle in a manner similar to what was described with reference to the two previous embodiments of the invention. This third embodiment is particularly suitable to displace the movable wires from a first to a second height above the ground in a completely automatic mode. In any case, if desired, the third embodiment of the apparatus can carry out the displacement of the wires through a repetitive manual control. In this third embodiment, the common elements in the first and/or second embodiment will be indicated with the same numeral references or with corresponding numeral references, and the description of their operation as well as that of their structure will not be repeated.

In this third embodiment, the frame 301 is provided with a pair of uprights 302, 303 slidingly associated to the ends of a framework 387 that extends transversally to the uprights 302, 303, forming thereby a space 305 that can be made to move without substantial interference in the lengthwise direction of a row of plants. The framework 387 includes a strut assembly 388 substantially consisting of two guide elements 389 on which are slidingly coupled the uprights 302 and 303 and a pair of transversal brackets 389A, 389B the end of which are fastened to the guide elements 389. The framework 387 is rotatably pivoted on a fastening body 390 by means of a pin 391 that extends parallel to the pair of transversal brackets 389A, 389B, that is transversally, and in particular perpendicularly, to the pair of uprights 302 and 303. Thanks to the pin 391, the frame 301 can rotate around it and compensate for any unevennesses of the ground that extend in the direction of travel of a farm vehicle (arrow "A" in FIG. 8) to which the apparatus can be associated, and/or to compensate for any tangles of vegetation in the operating parts of the machine as it moves forward along a row of plants. The rotation of the frame around the pin 391 is countered by fluid dampers 392A and elastic elements 392B interposed between the strut assembly 388 and the fastening body 390. In particular, in FIG. 8 the fluid-dynamics dampers 392A include a pair of gas dampers, while the elastic elements 392B consist of a pair of spiral springs having a first end fastened to the transversal bracket 389B and a second end fastened to the fastening body 390.

The fastening body 390 is in turn rotatably associated to a support body 311 by means of a pin 393 and a bracket 394 integral with the support body 311. The pin 393 extends in the direction of forward travel of the apparatus (arrow "A" in FIG. 8), and in this manner the frame 301 can oscillate transversally to the extension of the row of plants, thereby compensating for the unevennesses of the ground encountered by the farm vehicle on which the apparatus is mounted. To attenuate the oscillation of the frame 301, a damping actuator 394 is provided in position between the fastening body 390 and the support body 311.

On the framework 387 are connected a pair of conveying elements 395 comprising a pair of belts 396A and 396B driven by rollers 397, at least one of which is powered by a motor 398, for example of electric, pneumatic or hydraulic type. The conveying elements 395 extend forwardly of the frame 301 in the direction of forward travel of the frame above the row of plants when it is carried by a farm vehicle (arrow "A" in FIG. 8).

The conveying elements 395 interact with the vegetation when the frame 301 is moved along the row of vines, helping to displace them and thus preventing them from hindering the displacement of the movable wires. The belts 396A and 396B can be driven in both directions, thus making it possible to suitably arrange the vegetation without damaging it. In addition, the rollers 397 can have their axes of rotation reciprocally inclined in order to untwist the length of the belt.

On the framework 387 is mounted an electric motor 399 (FIG. 8) that drives a pair of toothed wheels 400 (only one of them is shown in FIG. 8) engaged in a rack, or a chain, provided on each of the two uprights 302, 303. This mechanical coupling is used to provide the displacement of the uprights 302, 303 with respect to the framework 387 in a direction substantially orthogonal to the ground. This displacement, which is added to the movement that can be applied to the whole frame 301 by means of the actuator 34, as described above with reference to the first two embodiments, is useful in the preliminary steps of preparation of the apparatus when the movable wires to be displaced are associated to it.

On each of the two uprights 302, 303 is mounted a pneumatic actuator, 401 and 402 respectively, provided with a pair of aeraulic conduits, 401A, 401B; 402A, 402B respectively, for its operation. Each of the actuators 401, 402 is interposed between the respective upright 302, 303 and the moving means 314 mounted on each of the two uprights 302, 303 to provide the displacement along the upright. In this third embodiment, the sequential and synchronized displacement of the moving means 314 in a direction orthogonal to the ground for the purpose of repositioning the movable wires of a row of plants is achieved by translating the moving means 314 along the uprights 302, 303 without needing to lift or lower the whole frame 301. In this manner, the weight of the moving masses is advantageously reduced.

Therefore, in this third embodiment, in the direction orthogonal to the ground it is possible to: displace the whole frame 301 by means of the actuator 34 (FIG. 2); displace the uprights 302, 303 with respect to the framework 387 by operating the electric motor 399; displace the moving means 314 with respect to the uprights 302, 304 by operating the actuators 401, 402.

The structure and the operation of the moving means 314 are substantially identical to those indicated with the numeral reference 114 in the previous description of the second embodiment of the invention. In particular, the displacement of the gripping elements 315 in the lengthwise direction of the movable wires F is achieved by means of an actuator 383, preferably consisting of a pneumatic cylinder provided with aeraulic conduits 384A and 384B for its operation. The actuator 383 can be controlled by means of aeraulic conduits 384A and 384B to move the gripping elements 315 away from and then toward the uprights 302, 303. In addition, the rotation around the pin 379 of each of the fins 378 provided on the moving means 314 is given by an actuator 380, preferably in the form of a pneumatic piston provided with a pair of aeraulic conduits 381A, 381B for its operation. The movement of the fins 378 is coordinated sequentially with the movement of the gripping elements 315.

The operating steps of the cycle for displacing the movable wires carried out by the third embodiment of the apparatus according to the invention are identical to ones in the process described with reference to the second embodiment of the invention. Naturally, as already mentioned, in this third embodiment the displacement of the gripping elements 315 provided on the moving means in a direction orthogonal to the ground will be carried out by the actuators 401, 402 instead of by the actuator 34 that moves the whole frame 301. The actuator 34 and the electric motor 399 are operated in the preparatory phases of installation of the apparatus above a row of plants and of association of the movable wires F to the gripping elements 315.

The displacement, along the uprights 302 and 303, of the gripping elements 315 provided on the moving means 314 is limited by a pair of sensing means 341A and 341B slidingly associated to the upright 302. In practice, when the gripping elements 315 in their movement along the uprights 302, 303 intercept one of the sensing means 341a, 341b, the displacement of the gripping elements 315 stops. The function of the sensing means 341A, 341B is identical to that of the sensing means 41A, 41B described with reference to the first and to the second embodiment.

The displacement cycle of the movable wires on a row of plants it started by sensing means 336 that substantially detect the moment when the frame 301 has just gone past a pole in the row of plants. Advantageously, the sensing means 336 are mounted on an element 386 that can be fastened to the frame of a farm vehicle or on the support body 311 as shown in FIG. 9. The element 386 makes it possible to adjust the position of the sensing means 336 in a direction orthogonal to the lengthwise direction of the movable wires so that a pole in the row that comes between the uprights 302, 303 is always intercepted by the sensing means 336. In addition, the sensing means 336 place themselves in a position behind the frame 301 seen in its direction of travel indicated by the arrow "A" in FIG. 8. The sensing means 336 are provided with a signal line S301 that signals the presence of an intermediate pole in the row, thereby starting the displacement of the movable wires F from a first height to a second height above the ground. Thanks to a pneumatic actuator 403, the sensing means 336 can be retracted so as not to interfere with the poles in the row when it is necessary to move the frame 301 above the row without carrying out the cycle of displacement of the movable wires F.

In this third embodiment it is possible to connect the aeraulic circuits feeding the conduits 365A, 365B for controlling the actuating means 321, consisting of pneumatic pistons, which displace the gripping elements 315 from a first position in which the latter are spaced apart from each other and a second position in which the gripping elements 315 are closer to each other. The connection of the aeraulic circuits is used to allow an immediate transfer of fluid from one actuator 321 to the other, thus enabling the gripping elements 315 that are moved close to each other, that is, in said second position, to move at the same time in the same direction of movement determined by the actuators 321 without moving apart from each other. This operating feature is particularly useful to compensate for unexpected displacements of the frame 301 and/or of the farm vehicle that moves it in a direction transversal to the extension of the row of plants, due, for example, to unevennesses of the ground. This avoids the possibility that the movable wires F engaged in the gripping elements 315 can be pulled transversally to the row together with the frame 301.

It was thus seen that the invention achieved the predetermined objective and purposes, as an apparatus was provided for the mechanized displacement of the movable wires of a row of plants with which the operator can organize the vegetation of plants arranged in rows of considerable length while remaining on board the farm vehicle on which the apparatus is removably mounted or incorporated. The apparatus can be extended on one side of the machine in a direction orthogonal to the direction of travel of the farm vehicle. As an alternative, the apparatus can be fastened to the front or rear part of the farm vehicle by means of suitable fastening systems possibly already prearranged on the same vehicle. In this manner, the farm vehicle can pass between two adjacent rows of plants, with the frame 1 astride the row undergoing treatment. Using suitable fastening systems, the apparatus according to the invention can also be connected to farm vehicles having a track (vehicle width) defined by a bridge structure capable of straddling a row of plants, with the wheels of said vehicle running along the two portions of land that extends between two adjacent rows of a set of three rows in the direction of extension of the same. In this case, the apparatus can be simply hung to the bridge structure by limiting the swinging displacements of the apparatus caused by any unevennesses of the ground on which the farm vehicle travels.

Thanks to the apparatus and to the process according to the invention, the vegetation involved in the displacement of the movable wires does not suffer any damage, and thus its natural growth is guaranteed. Advantageously, the apparatus according to the invention can operate in both the automatic mode, performing all the operations necessary to displace the movable wires whenever the equipment is in the vicinity of a pole in the row of plants, and in the semi-automatic mode, in which the operator starts manually the cycle for displacing the movable wires after having brought the apparatus in the vicinity of a pole in the row. The apparatus can advantageously be constructed in such a manner as to partly fold upon itself so as to take up the least space possible when not in use and to facilitate the movement of the farm vehicle when driven on the road.

The process of operation of an apparatus for the mechanized displacement of the movable wires on a row of plants can be easily adapted to rows of plants having different modes of arrangement and number of movable wires, wherein the same process can be equally effective. For this purpose, the sequence of synchronized movements accomplished by the gripping elements 15, 115, 315 along an axis parallel to the ground and an axis perpendicular to the ground, can be paced, as may be required, in different modes in relation to the displacement of the frame 1 along the row of plants. It was also found that the apparatus according to the invention can not only perform operations for lifting the movable wires but also for lowering the same wires without damaging the vegetation.

The embodiments of an apparatus for the mechanized displacement of the movable wires on a row of plants, in particular grapevines, according to the present invention are not limited to those shown in the accompanying drawings but may consist of various variant embodiments, all of them comprised in the scope of the enclosed claims. Also, the materials and dimensions of the individual components of the invention can be the most suitable for the specific requirements.

The invention claimed is:

1. A process of operation of an apparatus for the mechanized displacement of movable wires from a first to a second height, said wires being arranged on opposite sides of a row of plants, wherein the apparatus comprises a frame suitable to be removably mounted on a farm vehicle, said frame being provided with a mover configured to move said movable wires, wherein said mover comprises a pair of opposed gripping elements, each of which is suitable to slidingly receive one of said movable wires, said gripping elements being movable in a sequential and synchronized manner along at least two orthogonal axes to cause a displacement of said movable wires from a first height to a second height, the process comprising:
  a) arranging a frame astride the row of plants so as to position a mover to move the movable wires on opposite sides of said row;
  b) connecting the movable wires to a pair of gripping elements provided on said mover and arranging said frame in proximity of an intermediate pole of said row;
  c) moving said gripping elements and movable wires to the first prepositioning height through a sequential and synchronized displacement along at least one axis substantially orthogonal to the tilled ground in which said row is located; and
  d) arranging said movable wires at the second height through a sequential and synchronized displacement of said gripping elements along two axes, one substantially parallel to the tilled ground and the other perpendicular to said ground.

2. Process according to claim 1, wherein steps c) and d) are carried out while said frame is being moved along a direction of extension of the row of plants.

3. Process according to claim 2, wherein steps c) and d) are controlled by a sensor.

4. Process according to claim 1, wherein steps c) and d) comprise displacing said gripping elements along a direction parallel to a direction of extension of said movable wires.

* * * * *